UNITED STATES PATENT OFFICE.

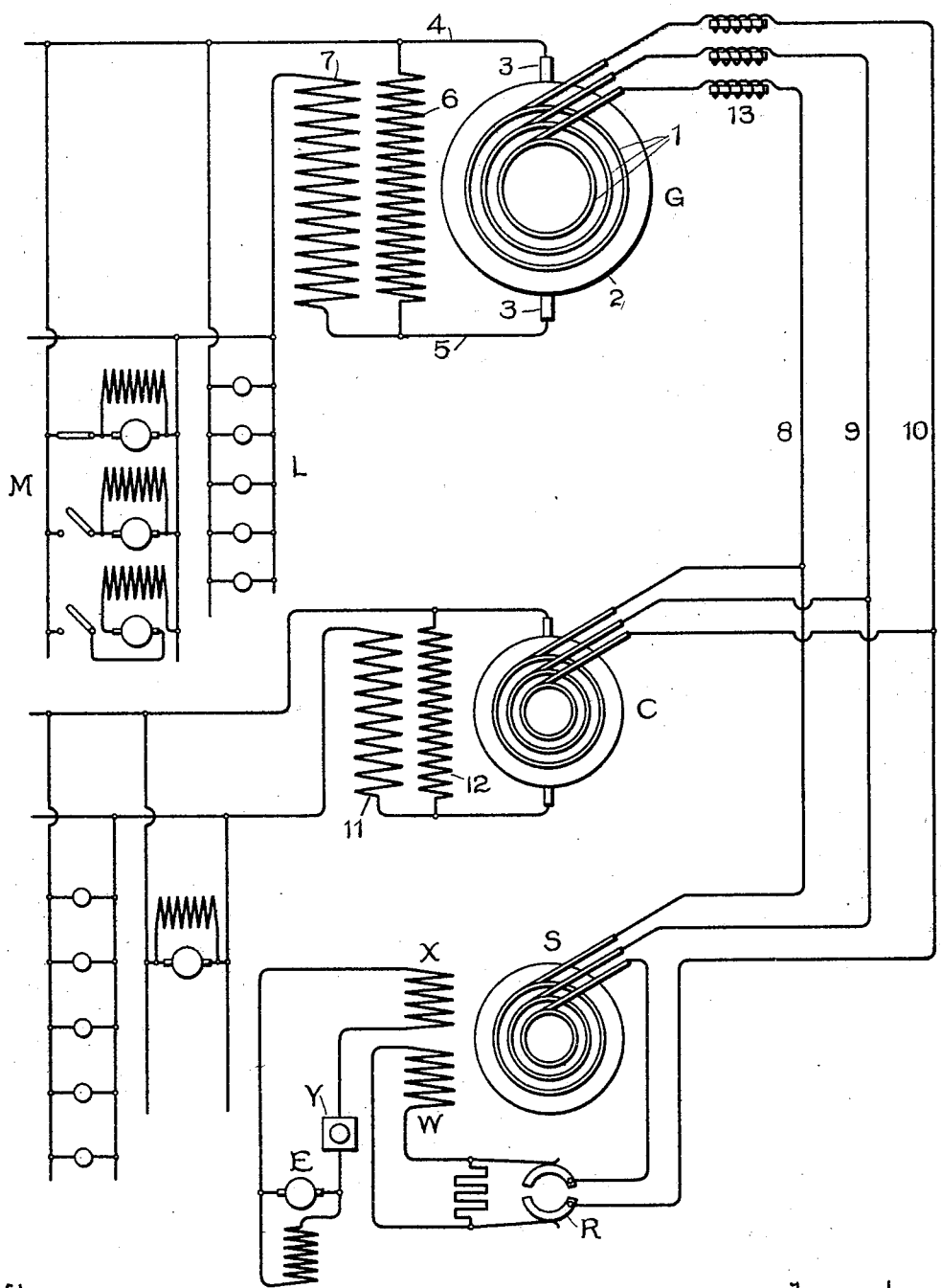

CHARLES P. STEINMETZ, OF SCHENECTADY, NEW YORK, ASSIGNOR TO THE GENERAL ELECTRIC COMPANY, OF NEW YORK.

REGULATION OF DYNAMO-ELECTRIC MACHINES.

SPECIFICATION forming part of Letters Patent No. 645,674, dated March 20, 1900.

Application filed December 15, 1899. Serial No. 740,387. (No model.)

*To all whom it may concern:*

Be it known that I, CHARLES P. STEINMETZ, a citizen of the United States, residing at Schenectady, county of Schenectady, State of New York, have invented certain new and useful Improvements in Regulation of Dynamo-Electric Machines, (Case No. 1,137,) of which the following is a specification.

The regulation of double-current generators is ordinarily attended with considerable difficulties. These machines closely resemble ordinary rotary converters in having a commutator and collector-rings, but differ therefrom in that they are driven by mechanical power and deliver both alternating current and continuous current. Unlike the rotary converter, the armature reactions due to the alternating and continuous currents do not oppose each other, but, on the contrary, act in conjunction to vary the field strength of the machine. The armature reaction of the machine therefore depends upon the total load, and as a consequence the commutator-brushes, unlike those of the rotary converter, require to be shifted more or less as the load changes. Since the effects of armature reaction depend upon both the alternating and the continuous current loads, it follows that a device responsive to one only of these loads is ineffective for purposes of regulation. Owing to this fact it has heretofore been the practice to effect the regulation of double-current generators by hand.

It is the object of the present invention to secure the desired regulation automatically and by means responsive to variations of load in both circuits of the machine.

The novelty of my invention both as to its broad features and more specific details will be particularly pointed out in the appended claims, while its organization and mode of application will be made clear by an examination of the following description, taken in connection with the accompanying drawings.

At G, I have indicated in diagram a double-current generator. This is shown as of the three-phase type, possessing collector-rings 1 and a commutator 2, upon which bear the commutator-brushes 3. Direct-current leads 4 5 extend from the brushes 3 and supply current to suitable translating devices, either lamps, motors, or the like. By the way of example, a bank of lamps is shown at L, while a number of direct-current motors of both the series and shunt wound types are shown at M, suitable switches being likewise shown for cutting the motors into or out of circuit. Like an ordinary compound-wound generator, the double-current machine is provided with two field-windings, one an ordinary shunt-winding 6 and the other a series winding carrying the total direct current delivered by the machine or a current proportional thereto. The function of these windings is identical with that of similar windings in a direct-current generator. As is well known, the demagnetizing effect of armature reaction in a direct-current machine is made up of two components, one of which, commonly known as the "cross-magnetization of the armature," has a comparatively-small effect on the field strength, while the other, due to the shifting of the brushes from a neutral position, acts in direct opposition to the field-magnetizing turns and, neglecting the effect of saturation, is directly proportional to the load. The resultant effects of the armature reaction, together with the drop of voltage due to ohmic loss, although not directly proportional to the load is approximately so, and may in practice be sufficiently compensated for by a series field of sufficient magneto-motive force. The series winding 7 of suitable proportions performs this function. This winding, however, is unresponsive to variations of armature reaction due to the alternating current of the machine.

The effect of the armature reaction due to the alternating current has some points of similarity to that due to the direct current. Thus, for example, like the direct-current armature reaction it has two components, one producing a cross-magnetization and the other a magnetization in line with that of the field. Unlike that due to the direct current, however, the magnetization acting in line with that of the field may assist or oppose and is caused not by shifting of brushes, since there are none, but by a shifting in phase of the alternating current. Thus with a lagging current the polarization in line with that of the field is demagnetizing, while when the current is leading the opposite effect takes place and the field strength is increased. The armature reaction due to the alternating current is therefore not in all cases directly dependent upon the load on the alternating mains, but depends rather on the shifting of phase of the alternating current and upon its magnitude as well. To overcome the effects of the alternating current on the field of the generator, it is therefore necessary to provide some means responsive to change in phase of the alternating current.

In accordance with the present invention I utilize the property possessed by rotary converters or synchronous motors for changing the amount of lagging or leading current in the alternating mains in accordance with the change in field excitation of these machines. The application of this principle in the present instance is shown in the drawings, in which a rotary converter C is shown as being supplied on its alternating-current side from the alternating leads 8, 9, and 10 of the double-current generator G, the direct-current end of the rotary converter C being connected to suitable translating devices in the ordinary manner. To secure the proper variation in field strength of the converter for change of load, a series winding 11 operates in conjunction with the usual shunt-winding 12, as is well understood. In order that change of field excitation of the converter may cause a shifting in phase of the alternating current supplied, it is necessary that the transmission-lines contain a certain amount of reactance in order that the leading current of the converter may produce the proper reaction. As generally adjusted the current in the line is arranged to lag, at least at no load, so that as the field strength of the rotary converter is increased with increasing load the lagging current of the line is gradually decreased until it is brought into phase, while with further increase in load the current in the supply-mains becomes leading.

The reactance for the transmission-lines is obtained by suitable reactive coils, (indicated at 13,) and if the effect of these coils is suitably porportioned and the fields of the rotary converters and the double-current generator properly related, so as to cause lagging current, for instance, to flow at no load, then the demagnetizing effect of this lagging current upon the field of the double-current generator is compensated for as the current increases by bringing it more closely into phase with the impressed electromotive force of the generator, while upon still further increase of load the alternating current becomes leading, thus producing a magnetizing action on the field of the double-current generator and so compensating for the drop in voltage due to ohmic and other losses and to the cross-magnetizing-armature reaction. It is to be noted that with lagging current the resultant magneto-motive force in the field-circuit is that due to the differential effect of the field ampere-turns and the demagnetizing ampere-turns of the armature. With leading current the magnetization is represented by the sum of these quantities. Consequently a decrease of lag and an increase of lead produce each the same general effect, and this principle is to be borne in mind in proportioning and adjusting the apparatus.

At S, I have shown a synchronous motor likewise fed from the mains 8, 9, and 10, and this motor is arranged to operate in substantially the same manner as the rotary converter C, due regard, however, being had to the fact that the motor acts only as a motor and does not deliver current to a consumption-circuit, as is the case with the rotary converter. Consequently in order to increase the field strength of the synchronous motor with increase of mechanical load some other expedient must be resorted to than the use of a series field. For this purpose a portion of the alternating supply-current is changed into unidirectional current by means of a suitable rectifying device, (shown at R,) the rectified current being passed through a winding W on the field of the motor. This winding W serves merely as a regulating-winding, the chief excitation of the field being derived from a separate source of direct current—such, for example, as an exciter E, the terminals of which are connected to the main exciting-winding X. A regulating-rheostat Y is included in series with this winding; but in many cases it might preferably be arranged in the field of the exciter E. These, however, are details which are not essential to the operation of my invention.

Although I have described my invention somewhat in detail in order the better to make clear its mode of application, it will of course be understood that I do not wish my claims thereto to be construed with corresponding limitations. On the contrary, the scope of my invention as to its broad features is much more extended.

What I claim as new, and desire to secure by Letters Patent of the United States, is—

1. The combination of a double-current generator, means for automatically compensating for the demagnetizing effect of the direct-current armature reaction, and separate means for compensating for the effects of the alternating-current armature reaction.

2. The combination of a double-current generator, means for compensating for the demagnetizing effect of the direct-current armature reaction, and separate means for compensating for the effects of the alternating-current armature reaction.

3. The combination of a double-current generator, means for compensating for the demagnetizing effect of the direct-current armature reaction, and automatically-operating means for compensating for the effect of the alternating-current armature reaction.

4. The combination of a double-current generator, means for automatically compensating for the demagnetizing effect of the direct-current armature reaction, and for the effects of the alternating-current armature reaction.

5. The combination of a double-current generator having direct-current shunt and series field-windings and means connected to the alternating-current mains for automatically changing the phase displacement of the alternating current with change of load.

6. The combination of a double-current generator having direct-current, shunt and series field-windings, of distributing-conductors for the alternating current, inductance in said conductors, and a synchronous, dynamo-electric machine connected to said conductors.

7. The combination of a double-current generator having direct-current, shunt and series field-windings, of distributing-conductors for the alternating currents, inductance in said conductors, and a compound-wound rotary converter connected to said conductors.

8. The combination of a double-current generator having direct-current shunt and series field-windings, of a rotary converter supplied from the alternating transmission-lines of said generator, and means for varying the field of the converter with variation of load.

9. The combination of a double-current generator having direct-current shunt and series field-windings, of a rotary converter supplied from the alternating-current-transmission lines of said generator, a series winding in said converter, and inductances in said transmission-lines.

In witness whereof I have hereunto set my hand this 13th day of December, 1899.

CHARLES P. STEINMETZ.

Witnesses:
BENJAMIN B. HULL,
MABEL E. JACOBSON.